Oct. 6, 1931.   A. R. LAWRENCE   1,826,666
EXPANSION JOINT
Filed July 25, 1930   2 Sheets-Sheet 1
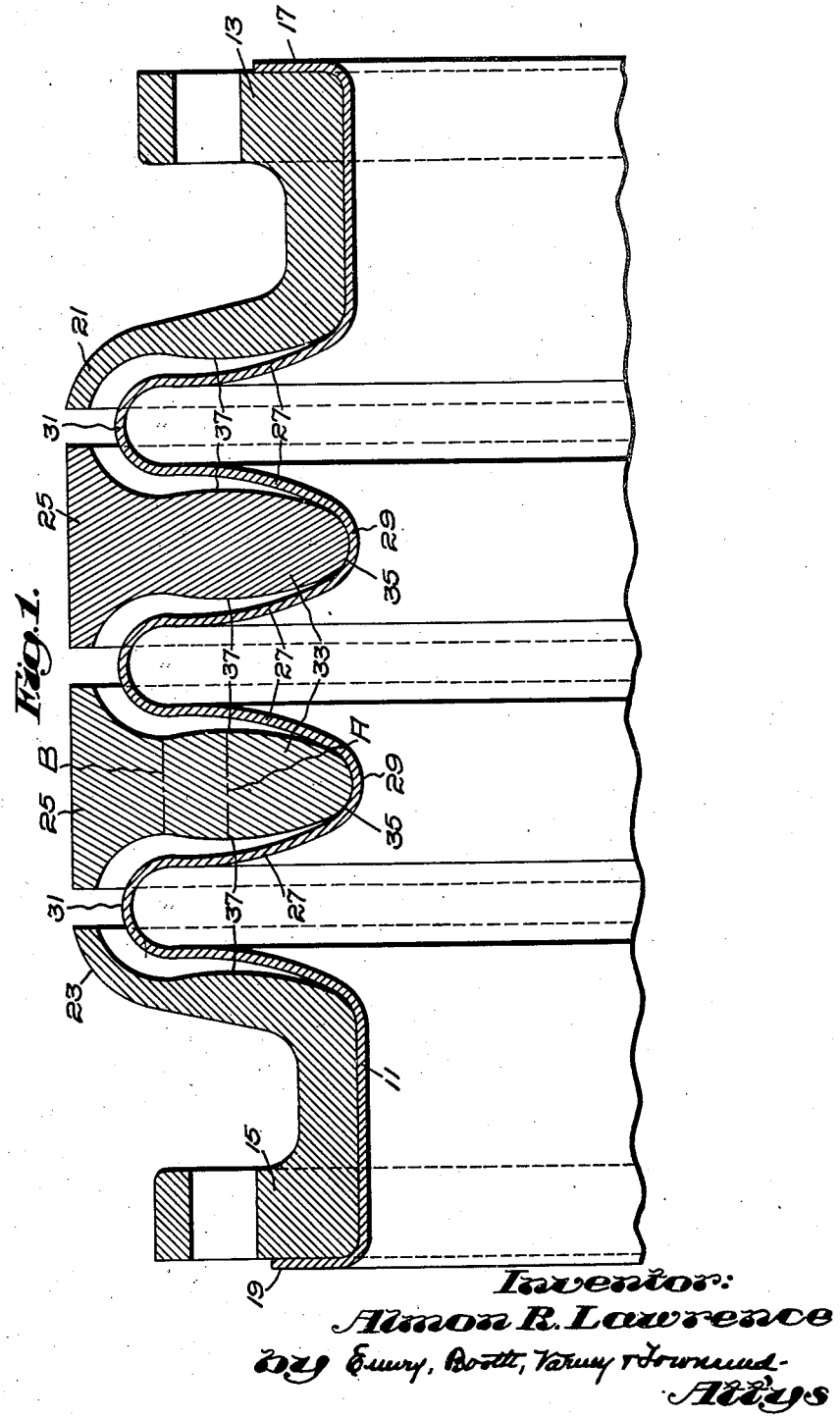

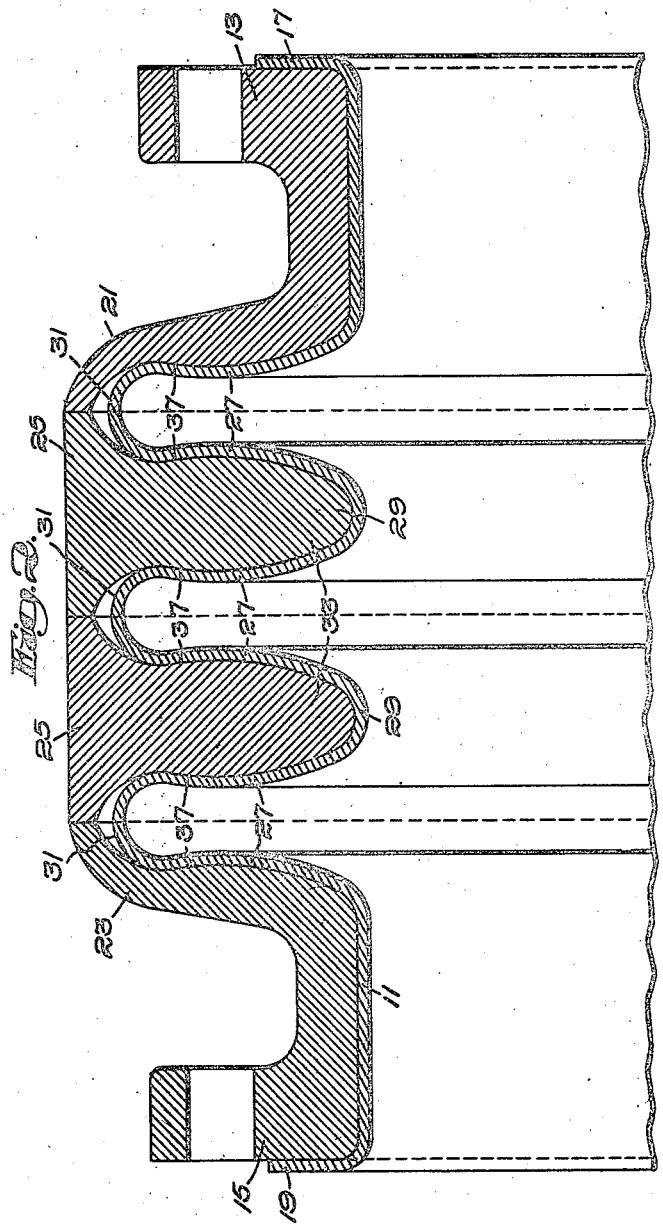

Patented Oct. 6, 1931

1,826,666

UNITED STATES PATENT OFFICE

ALMON R. LAWRENCE, OF MEDFORD, MASSACHUSETTS, ASSIGNOR TO E. B. BADGER & SONS COMPANY, OF BOSTON, MASSACHUSETTS, A CORPORATION OF MASSACHUSETTS

EXPANSION JOINT

Application filed July 25, 1930. Serial No. 470,607.

This invention relates to expansion joints or couplings and methods of reinforcing the same, and more particularly to those used for relatively heavy duty in pipe lines where expansion and contraction are taken up by the walls of relatively deep corrugations of a metallic sleeve employed in association with reinforcing rings or other members.

The invention will be best understood by reference to the following description when taken in connection with the accompanying illustration of one specific embodiment thereof, while its scope will be more particularly pointed out in the appended claims.

In the drawings:—

Fig. 1 is a sectional, longitudinal, central elevation showing in expanded relation the upper portion of one form of expansion joint constructed in accordance with the herein described invention; and Fig. 2 is a similar sectional elevation showing the position assumed by the corrugations when the joint is in its completely contracted condition and under internal pressure.

Referring to the drawings and to the illustrative form of the invention therein shown, the expansion member of the joint is in the form of a metallic, tubular conduit 11 provided with one or more corrugations or circumferential enlargements so as to provide a member capable of longitudinal expansion and contraction on movement in the direction of its axial length. The joint may be formed with any number of such corrugations, according to the service to which it is to be applied, but herein for illustration it is shown as provided with three circumferential ridges, having two intermediate grooves or depressions. The expansion member is in the form of a continuous corrugated sleeve which may be of any suitable metal, such as copper or the like, to enable it to undergo repeated expansions and contractions without deterioration.

The end portions of the expansion member of the joint may be secured in any desired manner to the adjacent sections of the pipe line to form a fluid tight conduit, but herein a common method is illustrated which comprises fastening the end portions of the sleeve to the rings or flanges 13 and 15 which are adapted to be bolted to the flanges of the ends of adjoining pipe line sections so as to clamp between them the flanged ends 17 and 19 of the metallic sleeve.

The illustrative form of exansion joint is further provided with external, closely fitting, circumferential, reinforcing members in the form of end rings 21 and 23, herein formed integrally with the flanges 13 and 15, together with intermediate rings 25 which seat in the grooves or depressions between successive corrugations. These rings engage the outer walls of the sleeve and are axially separable and independently movable with the expansion and contraction of the sleeve. Each ring may be composed of two halves bolted, welded or otherwise secured together and is provided with peripheral edges adapted to abut against each other when the joint is contracted (as indicated in Fig. 2) but to separate (as indicated in Fig. 1) when the joint is expanded.

The opposing peripheral edges of the several rings 21, 23 and 25, as is well understood in the art, form limiting abutments which limit the contracting movement of the sleeve and tend to equalize the flexing at the several corrugations thereof.

In the disclosed embodiment of the invention a novel construction is provided in respect to the shape and relationship of the corrugations and the reinforcing rings which has an important effect on the length of life, durability and efficiency of the joint.

In the construction of heavy duty expansion joints conditions of usage require that metal of sufficient thickness be employed in the corrugated sleeve to withstand the internal pressure of the pipe line. On the other hand, however, it is desirable that the joint should have a maximum amount of flexibility, or, in other words, should be capable of collapse or contraction axially under the smallest amount of pressure lengthwise the pipe line. To secure the required range and the required ease or flexibility of contraction and expansion for a given size of sleeve, the corrugations, therefore, should be of substantial depth with the convexed, arch-shaped walls at its crest or ridges and the concaved bottom portions at the grooves or hollows formed under a curvature of reasonably small radius and connecting side walls of relatively great area. Such a construction gives the desired ease of axial contraction or flexibility and prevents the pitch or spacing between successive corrugations from becoming so great relatively to their depth as to stiffen the joint. In other words, generally speaking, the deeper the corrugations with relation to their width, the more flexible becomes the joint.

In the construction of expansion joints of the prior art, to secure the necessary relative depth of corrugation, it has been the practice to so form the side walls that, as viewed in cross section, the side wall is represented by a straight element of substantial length in tangential relation to the curved convex arch at the top and the curved concave wall at the bottom. In the sleeve, viewed as a whole, this side wall ordinarily comprises a part of the body of a hollow cone when the joint is expanded. The straight side wall portion constitutes a relatively stiff wall section which resists deformation.

It has further been the practice to provide with such a form of corrugation also an external reinforcing ring having an inturned annular web or tongue seating in the concave groove or hollow of the sleeve and presenting thereto a convex bearing surface, about which the grooved bottom surface wraps and against which it tightly seats when the joint is contracted. But such web or tongue has also presented to the relatively stiff side wall a seating surface which is of the same character as that of the side wall, that is to say, represented by a straight element as viewed in cross section.

The result is that in the contraction and expansion of such a joint, since the side walls of the corrugation are relatively stiff and resist deformation, and since they seat against a reinforcing surface which tends to preserve that stiffened formation when the joint is contracted, the flexing action which takes place, instead of being distributed throughout the entire section of the corrugation, as it should be for best results, tends to be unduly concentrated into two relatively small areas,—one where the side wall joins the concave hollow and the other where it joins the outer convex arch.

The function of the reinforcing rings is not to reinforce the metal of the sleeve against internal pressure within the pipe line. A thickness of metal sufficient to withstand the repeated flexing required is sufficient to withstand the internal pressure to which such joints are customarily subjected. In addition to equalizing the contraction and expansion between the several corrugations, the primary function of the reinforcing rings should be to serve as a seat or backing for the metal of the corrugation so as to best reinforce and control it in its flexing action.

It is seldom that expansion joints such as described fail under collapse of internal pressure. Their failure is almost invariably due to breakage from fatigue of the metal or loss of capacity to flex under repeated contractions and expansions, and long continued observations have shown that such breakage nearly always occurs along the areas mentioned where the strains of flexing have been concentrated, to wit, where the side walls of the corrugations join the outer convex arches, or, more often, where the side walls join the concave hollows. I have found that by properly designing the seating surface presented by the reinforcing ring and the contour of the side walls of the corrugations which are adapted to seat against that ring, the flexing of the sleeve may be so controlled and distributed that the life of the joint is greatly lengthened and it is able to undergo repeated expansions and contractions for a much longer period than heretofore without fatigue or breakage of the metal.

Furthermore, since the limiting factor in selecting the thickness of the metal employed is the capacity to flex repeatedly without breakage rather than its capacity to withstand internal pressure, a metal may be employed for the joint of relatively greater thinness, increasing substantially the ease with which the joint as a whole acts to flex and contract. It has also been found that the life of a joint, as measured by its continued capacity to withstand repeated contractions and expansions, is increased by reducing the thickness of the metal in the sleeve, so that the durability of the joint from that cause may be substantially increased through the employment of metal in the sleeve of lesser thickness than heretofore, as well as from properly controlling the corrugations.

In the expanded joint herein disclosed the reinforcing member is so shaped and the corrugation of the sleeve is initially so formed that the flexing action is distributed throughout the entire cross section and the areas at the sides of the arches and hollows are relieved of that concentrated flexing action which has caused the breakage referred to.

Referring to the drawings, first to Fig. 1, where the sleeve is shown without internal pressure and in its normally unstressed shape, or that in which it is initially formed, the side walls 27 of each corrugation are in the form of convex surfaces represented in cross section by curved elements but of lesser sharpness of curvature than the concave bottom walls 29 or the convex arched walls 31. In the illustrative form of joint the sectional elements representing the concave hollows and the convex arches are each in the form of an arc of a circle having a relatively small radius, while the elements representing the side walls are each in the form of an arc of a circle having a relatively great radius, and herein several times that of the radius of curvature of the hollows and arches.

To cooperate with this form of side wall, the inwardly projecting annular web or tongue 33 on the reinforcing member presents not only a convex seating edge 35 for the concave walls 29 of the grooves or hollows between the corrugations, but also a convex-concave seating surface 37 for the side walls of the corrugation. The latter, as viewed in cross section, is represented by a line curving first outwardly toward the side walls and then inwardly away from the side walls of the corrugation, providing a re-entrant formation, the tongue forming a slight bulge within the corrugation, its inner (or lower as viewed in Fig. 1) mid portion being wider (as at the line A) than the outer (or upper as viewed in Fig. 1) portion thereof (as at the line B) which lies near the convexed arch portion of the corrugation.

Accordingly, when such strains are placed on the pipe line, of which the joint forms a part, as to cause a contraction of the joint, its contraction in length is accompanied first by a seating of the curved walls of the hollow grooves 29 about the convex edges 35 of the several reinforcing rings, and then gradually, as the contraction continues, by the seating of the curved or concave side walls of the corrugation upon the curved sides 37 of the reinforcing ring, the side walls gradually wrapping themselves about and against the reinforcing ring until some such condition is reached as is represented in Fig. 2. In the contracted position of the joint (Fig. 2) the cross sectional element of the side wall 27 of any corrugation first curves inwardly from the concave hollow and then outwardly, forming between the concave hollow and the convex crest an inwardly dished or convex surface surmounted by an outward bulge, both the convex surface and the surmounting bulge seating against a mating surface on the ring.

Since the section of the side wall is represented for its entire length by a curved line and that of the seating surface on the ring also by a curved line, the side walls are gradually flexed for their entire length as the contraction proceeds and the stresses of flexing are distributed throughout the section instead of being concentrated, as heretofore, at or near the junctions of the side walls with the bottom grooves and outer arches. The curved but relatively flattened side walls, which are controlled as to flexing and pressure distortion by the curved seating walls of the ring, serve to compensate for the contraction and expansion which take place in the joint. Since the side walls are continuously curved and relatively flat as compared with the hollows and arches, a relatively deep corrugation may be had in which the depth, when the joint is contracted, is substantially greater than one-half the axial width of the corrugation or the spacing between the centers or successive crests and hollows, and in the form illustrated greater than such spacing, so that the joint is capable of ready response to flexing without distortion from its designed shape and the major part of the compensation for contraction and expansion is provided by the side walls.

The re-entrant formation in the reinforcing ring permits the flexing action of the side walls to extend up to and through the convex arched walls 31, permitting such arched walls to flex under natural conditions, and at the same time to assume the shape under which they are best fitted to carry and resist the internal pressure within the joint.

It will be observed that in the contracted condition of the joint (Fig. 2), due to the inward bulge or enlargement of the reinforcing web or tongue, the reinforcing rings are held firmly locked in position and may be removed or separated diametrically only in the expanded condition of the joint.

Since conditions of internal pressure are usually accompanied by a contraction of the sleeve, this leaves the stresses imposed by internal pressure to be assumed, as they should be, by the metal of the sleeve, and relieves the rings of such pressure stresses, so that the material of the rings may be selected and the rings constructed with regard only to their proper function of controlling the flexing and not with reference to withstanding the stresses of internal pressure.

While I have herein shown and described for purposes of illustration one form of corrugation and reinforcing ring, such having a specific form of curvature, it is to be understood that the particular form of curvature to be followed may be varied within wide limits and that the principle of the invention, whereby the walls of the reinforcing means progressively control the flexing of the walls of the corrugation, distribute the distortion and flexing thereof, and prevent their undue localization at any one portion of the corrugation, may be applied to expansion joints having widely different constructions, all without departing from the spirit of the invention.

Claims:

1. As an article of manufacture, an expansion coupling comprising a peripherally corrugated sleeve capable of expansion and contraction, said sleeve having a corrugation comprising an outer, convex arch portion with concave side walls, a plurality of separable, circumferential members in engaging relation to the outer walls of the corrugation for controlling the flexing thereof, said members presenting to each side wall of the corrugation a curved, convexed seating surface, the space between the side wall seating surfaces on opposite sides of said corrugation being greater near the convexed arch portions than immediately below when said coupling is contracted.

2. An expansion joint having a peripherally corrugated sleeve capable of expansion and contraction, and a circumferential member for controlling the flexing of said sleeve having an inturned annular web with convex edges seating on the concave bottom wall between adjacent corrugations and presenting curved seating surfaces for the side walls of said corrugations, said seating surfaces being curved from their convex edges first outwardly and then inwardly to provide inwardly dished seating surfaces near the convex arch of the corrugation.

3. An expansion joint having a peripherally corrugated sleeve capable of contraction and expansion, said sleeve having a member for controlling the flexing thereof presenting seating surfaces between the side walls of adjacent corrugations curved to smoothly fit the said side walls substantially throughout their height when the joint is contracted, the seating surfaces of said member being separated by a space which is narrower toward the crest of said corrugations than toward the bottoms thereof.

4. An expansion joint comprising a peripherally corrugated sleeve capable of expansion and contraction, a circumferential member disposed in each of the inwardly extending grooves and presenting to the walls of the groove a curved inner surface and convex side walls merging therewith having a curvature on a substantially larger radius to present a continuous curved surface for progressively engaging the walls of the corrugation for presenting undue localization of flexing strains as said sleeve is flexed.

5. An expansion joint comprising a peripherally corrugated sleeve capable of expansion and contraction, a plurality of separable circumferential members disposed adjacent the respective sides of the corrugation and presenting curved inner surfaces and convex side walls merging therewith and curved on substantially larger radii than the curve of the inner surfaces to present continuous curved surfaces for progressively engaging the walls of the corrugation for preventing undue localization of flexing strains as said corrugation is flexed.

6. As an article of manufacture, an expansion coupling comprising a peripherally corrugated expansible and contractible sleeve formed with a relatively deep corrugation comprising an outer curved convex arch portion and curved side walls having a flatter curvature than that of the said arch portion, and annular members having seating surfaces lying adjacent the curved side walls of said corrugation said seating surfaces being smoothly convexly curved with a less radius of curvature than said side walls to progressively engage therewith as the joint is contracted, thereby providing for control of the distortion and flexing of the curved side walls of said corrugation upon expansion and contraction of said joint.

7. As an article of manufacture, an expansion coupling of the type comprising a flexible expansible and contractible corrugated sleeve having a relatively deep corrugation of a depth when the joint is contracted substantially greater than one-half the width of the corrugation and having so-called "reinforcing rings" associated therewith provided with smooth seating surfaces for the support of the corrugation side walls when the coupling is contracted, said expansion coupling embodying the improvement that the seating surfaces of the reinforcing rings comprise side wall engaging portions progressively retreating from the corrugation side walls associated therewith so as to progressively engage with and flex the same during contraction of the coupling to control the distribution of distortion and flexing of the corrugation incident to contraction and expansion of the coupling and prevent undue localization of such distortion and flexing at any one portion of the corrugation.

8. As an article of manufacture, an expansion coupling of the type comprising a flexible expansible and contractible corrugated sleeve having so-called "reinforcing rings" associated therewith provided with smooth surfaces for the support of the corrugation side walls when the coupling is contracted: said expansion coupling embodying the improvement that the corrugation comprises outer and inner arched portions connected by curved side walls having a radius of curvature greater than that of said arched portions; and that the seating surfaces of the reinforcing rings comprise arch engaging portions of less radius of curvature than the normal radius of curvature of the engaged arch portion, and side wall engaging portions progressively retreating from the curved side walls so as to progressively engage with and flex the same during contraction of the coupling to prevent undue localization of distortion and flexing at any one portion of the corrugation.

In testimony whereof, I have signed my name to this specification.

ALMON R. LAWRENCE.

CERTIFICATE OF CORRECTION.

Patent No. 1,826,666.  Granted October 6, 1931, to

ALMON R. LAWRENCE.

It is hereby certified that error appears in the printed specification of the above numbered patent requiring correction as follows: Page 4, line 101, claim 8, after the word "smooth" insert the word seating; and that the said Letters Patent should be read with this correction therein that the same may conform to the record of the case in the Patent Office.

Signed and sealed this 15th day of December, A. D. 1931.

(Seal)

M. J. Moore,
Acting Commissioner of Patents.